United States Patent
Chen et al.

(10) Patent No.: US 9,617,373 B2
(45) Date of Patent: Apr. 11, 2017

(54) CURABLE RESIN COMPOSITION, ARTICLE, AND METHOD FOR FABRICATING THE SAME

(71) Applicant: LEE CHANG YUNG CHEMICAL INDUSTRY CORPORATION, Kaohsiung (TW)

(72) Inventors: Yu-Tien Chen, Changhua County (TW); Po-Nien Tsai, Tainan (TW); Ruoh-Huey Uang, Hsinchu County (TW)

(73) Assignee: LCY Chemical Corp., Kaohsiung (TW)

(*) Notice: Subject to any disclaimer, the term of this patent is extended or adjusted under 35 U.S.C. 154(b) by 0 days.

(21) Appl. No.: 14/622,324

(22) Filed: Feb. 13, 2015

(65) Prior Publication Data
US 2016/0237200 A1    Aug. 18, 2016

(51) Int. Cl.
*C08G 59/42* (2006.01)
*C08G 59/50* (2006.01)
*C08G 59/68* (2006.01)

(52) U.S. Cl.
CPC ......... *C08G 59/42* (2013.01); *C08G 59/5073* (2013.01); *C08G 59/686* (2013.01)

(58) Field of Classification Search
None
See application file for complete search history.

(56) References Cited

U.S. PATENT DOCUMENTS

| | | | | |
|---|---|---|---|---|
| 4,467,063 A * | 8/1984 | Lockhart | ............... | C08K 5/5442 524/106 |
| 4,472,551 A * | 9/1984 | White | ............... | C08K 5/00 524/728 |
| 4,472,564 A * | 9/1984 | Lockhart | ............... | C08K 5/00 528/18 |
| 4,477,625 A * | 10/1984 | Lockhart | ............... | C08K 3/34 524/450 |
| 4,487,914 A | 12/1984 | Barton | | |
| 4,499,230 A * | 2/1985 | Lockhart | ............... | C08K 3/34 524/450 |
| 4,554,310 A * | 11/1985 | Wengrovius | ............... | C08K 5/3445 252/390 |
| 4,554,338 A * | 11/1985 | Wengrovius | ............... | C08K 5/57 252/389.1 |
| 5,030,691 A * | 7/1991 | Kohmitsu | ............... | C08G 65/336 525/100 |
| 5,489,479 A * | 2/1996 | Lucas | ............... | C08K 5/57 428/412 |
| 5,969,036 A | 10/1999 | Dershem | | |
| 6,235,832 B1 * | 5/2001 | Deng | ............... | C08L 83/04 524/492 |
| 6,265,516 B1 * | 7/2001 | Okawa | ............... | C08G 77/38 528/26 |
| 7,423,095 B2 * | 9/2008 | Gordon | ............... | C08G 18/61 106/287.11 |
| 2005/0065275 A1 * | 3/2005 | Takahashi | ............... | C08J 5/18 524/588 |
| 2006/0205237 A1 * | 9/2006 | Kodama | ............... | C09D 183/06 438/790 |
| 2007/0212556 A1 * | 9/2007 | Musa | ............... | C08F 220/18 428/447 |
| 2009/0091045 A1 * | 4/2009 | Tanikawa | ............... | C08G 59/306 257/791 |
| 2009/0302280 A1 * | 12/2009 | Simone | ............... | C07F 7/0854 252/512 |
| 2010/0001311 A1 * | 1/2010 | Taguchi | ............... | C08L 63/00 257/100 |
| 2010/0006224 A1 * | 1/2010 | Levandoski | ............... | C08L 83/06 156/329 |
| 2010/0171414 A1 * | 7/2010 | Tanikawa | ............... | C08L 83/12 313/502 |
| 2011/0028602 A1 | 2/2011 | Gan | | |
| 2011/0054072 A1 * | 3/2011 | Sawada | ............... | C08G 59/3236 523/353 |
| 2011/0178225 A1 * | 7/2011 | Kudo | ............... | C08F 283/12 524/507 |
| 2013/0068304 A1 * | 3/2013 | Kanematsu | ............... | H01L 31/048 136/259 |
| 2015/0291808 A1 * | 10/2015 | Oya | ............... | C09D 5/1693 428/425.5 |

FOREIGN PATENT DOCUMENTS

TW    201127907    8/2011

* cited by examiner

*Primary Examiner* — Robert S Loewe
(74) *Attorney, Agent, or Firm* — Muncy, Geissler, Olds & Lowe, P.C.

(57) ABSTRACT

A curable resin composition, an article, and a method for fabricating the same are provided. The curable resin composition includes an epoxy resin; an anhydride; and a catalyst. In particular, the catalyst includes an imidazole and an organic metal compound, and the organic metal compound includes an organic tin compound, organic zinc compound, organic nickel compound, organic cobalt compound, organic copper compound, organic chromium compound, or a combination thereof.

16 Claims, No Drawings

CURABLE RESIN COMPOSITION, ARTICLE, AND METHOD FOR FABRICATING THE SAME

BACKGROUND

Technical Field

The disclosure relates to a curable resin composition, an article, and a method for fabricating the same, and in particular to a curable epoxy resin composition, an article, and a method for fabricating the same.

Description of the Related Art

Epoxy resin has been used in copper clad laminates and printed circuit boards for many years due to the great adhesion strengths between epoxy resin and reinforcing materials. Further, there is no volatile component produced when curing epoxy resin, and epoxy resin exhibits low shrinkage after molding. Moreover, due to the excellent adhesion, great mechanical strength, and electrical insulation properties, epoxy resin is widely used in the photoelectric field, serving as an adhesive, coating, packaging, composite material, or functional film.

However, due to the disadvantages of being brittle, having poor fatigue resistance, and having poor thermal resistance resulting from the low tenacity and the low thermal decomposition temperature, applications for conventional epoxy resin are restricted.

Therefore, a novel epoxy resin composition is required to solve the aforementioned problems.

SUMMARY

According to an embodiment of the disclosure, the disclosure provides a curable resin composition, such as a curable epoxy resin composition. The curable resin composition includes an epoxy resin; an anhydride; and a catalyst. In particular, the catalyst includes an imidazole and an organic metal compound, and the organic metal compound includes an organic tin compound, organic zinc compound, organic nickel compound, organic cobalt compound, organic copper compound, organic chromium compound, or a combination thereof.

According to another embodiment of the disclosure, the disclosure provides an article which is a reaction product of the aforementioned curable resin composition.

According to other embodiments of the disclosure, the disclosure provides a method for fabricating an article. The method includes subjecting the aforementioned curable resin composition to a thermal treatment to obtain the article.

A detailed description is given in the following embodiments with reference to the accompanying drawings.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

The disclosure provides a curable resin composition, an article and a method for fabricating the same. According to embodiments of the disclosure, the curable resin composition of the disclosure can be cured by subjecting the composition to a thermal treatment with a process temperature between about 50° C. and 150° C. (such as between 50° C. and 100° C.), since the curable resin composition includes a catalyst including an imidazole and an organic metal compound in a specific weight ratio. Further, the article obtained by curing the curable resin composition of the disclosure can have a high mechanical strength, high tenacity, high thermal stability, and high thermal decomposition temperature (Td).

According to embodiments of the disclosure, the curable resin composition, such as a curable epoxy resin composition, includes an epoxy resin; an anhydride; and a catalyst. In particular, the catalyst can include an imidazole and an organic metal compound. According to other embodiments of the disclosure, the catalyst can essentially consist of an imidazole and an organic metal compound with a specific weight ratio in order to facilitate the curable resin composition of the disclosure to be able to be cured by subjecting the composition to a thermal treatment with a process temperature between about 50° C. and 150° C. (such as 50° C. and 100° C.). The curable resin composition of the disclosure can be applied in the fabrication of copper clad laminates and/or printed circuit boards. Furthermore, the curable resin composition of the disclosure can serve as an adhesive, coating, packaging, composite material, or functional film and can be used in various optical and electronic products.

In embodiments of the disclosure, the epoxy resin can include a bisphenol A epoxy resin, aliphatic epoxy resin, naphthalene epoxy resin, biphenyl epoxy resin, phenolic novolac epoxy resin, cresol novolac epoxy resin, fluorine-containing epoxy resin, aralkyl epoxy resin, or a combination thereof. For example, the epoxy resin can be DER-383 (diglycidyl ether of bisphenol A, available from Dow Chemical Company), DER-331 (diglycidyl ether of 4,4-isopropylidene bis(phenol), available from Dow Chemical Company), NPEL-127 (bisphenol A epoxy resin with an epoxy value of 0.5453 mol/g, commercially available from Nanya Plastic Co.), or NPEL-128 (glycidyl polyether of bisphenol A having an Epoxy Equivalent Weight of 186-192, commercially available from Nanya Plastic Co.). The anhydride can include pyromellitic dianhydride (PMDA), maleic anhydride (MA), methyltetrahydrophthalic anhydride (MTHPA), methylnadic anhydride (MNA), hexanhydrophthalic anhydride (HHPA), methylhexahydrophthalic anhydride (MHHPA), or a combination thereof. The imidazole can include 2-undecylimidazole, 2-heptadecylimidazole, 2-methylimidazole, 2-ethyl-4-methylimidazole, 2-phenylimidazole, 2-phenyl-4-methylimidazole, 1-benzyl-2-methylimidazole, 1-benzyl-2-phenylimidazole, 1,2-dimethylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-undecyl imidazolium trimeritate, 1-cyanoethyl-2-phenyl imidazolium trimeritate, 2-phenyl-4,5-dihydroxymethylimidazole, 2-phenyl-4-methyl-5-dihydroxymethylimidazole, or a combination thereof.

According to embodiments of the disclosure, the organic metal compound can include Sn, Zn, Ni, Co, Cr, and/or Cu, such as an organic tin compound, organic zinc compound, organic nickel compound, organic cobalt compound, organic copper compound, organic chromium compound, or a combination thereof. For example, the organic metal compound of the disclosure can include tin (II) 2-ethylhexanoate, tin isopropoxide, tin oxalate, zinc 2,4-pentane dionate, zinc acetate, zinc oxalate, dibutyltin diacetate, dibutyltin dilaurate, dioctyltin diacetate, zinc naphthenate, zinc carboxylate, nickel carboxylate, or a combination thereof.

According to embodiments of the disclosure, for the various applications, the curable resin composition can further include a pigment, filler (such as fused silica, glass powder, aluminum nitride, boron nitride, silicon carbide, aluminum tripolyphosphate, aluminum hydroxide, titanium oxide, aluminum oxide, barium sulfate, mica, or combinations thereof), modifier, thickener, defoaming agent, mold release agent, stabilizer, fire retardant agent, surfactant (such as a cationic surfactant, anionic surfactant, or a bridging surfactant), or a combination thereof.

According to embodiments of the disclosure, the weight ratio between the anhydride and the epoxy resin can be about from 0.1 to 0.8 (such as from 0.15 to 0.5, or from 0.15 to 0.25). When the amount of anhydride is too low, the curable resin composition of the disclosure will not be cured by being subjected to a thermal treatment. On the other hand, when the amount of anhydride is too high, the curable resin composition of the disclosure will have a poor film forming ability, resulting in a granular product with a low thermal decomposition temperature (Td) after curing. In embodiments of the disclosure, the weight ratio between the catalyst and the anhydride can be from about 0.02 to 0.3 (such as from 0.02 to 0.1, or from 0.03 to 0.08), and/or the weight ratio between the catalyst and the epoxy resin can be from about 0.005 to 0.06 (such as from 0.005 to 0.02, or from 0.006 to 0.015). When the amount of catalyst is too low, the curable resin composition of the disclosure will be cured at a relatively high temperature (such as a temperature higher than 150° C.). On the other hand, when the amount of catalyst is too high, the cured product of the curable resin composition of the disclosure will have disadvantages such as being brittle and having a low mechanical strength. According to embodiments of the disclosure, the weight ratio between the organic metal compound and the imidazole can be from about 1 to 60, such as from 1 to 15, from 1 to 10 or from 1.5 to 10. When the amount of organic metal compound is too low, the curable resin composition of the disclosure will have low thermal stability. On the other hand, when the amount of organic metal compound is too high, the cured product of the curable resin composition of the disclosure will have disadvantages like being brittle and having a low mechanical strength.

According to embodiments of the disclosure, the disclosure also provides an article, which is a reaction product of the curable resin composition of the disclosure. The article can be a coating, a film, or a solid product with a specific shape after a molding process. Furthermore, the article can be a part of an optical or electronic device. It should be noted that, due to the specific catalyst and the specific weight ratio of the components, the article obtained by subjecting the curable resin composition of the disclosure to a thermal treatment can have a higher thermal decomposition temperature than about 260° C., such as between 260° C. and 400° C.

According to embodiments of the disclosure, the disclosure also provides a method for preparing the aforementioned article, and the method includes subjecting the curable resin composition of the disclosure to a thermal treatment to obtain the article. Furthermore, before subjecting the curable resin composition to the thermal treatment, the curable resin composition can be coated to form a coating or a film, or can be delivered into a mold. In embodiments of the disclosure, the thermal treatment has a higher process temperature than about 50° C. such as between 50° C. and 100° C.

In an embodiments of the disclosure, when the weight ratio between the catalyst and the epoxy resin is from about 0.01 to 0.012 and the weight ratio between the organic tin compound and the imidazole is from about 9 to 11, the curable resin composition of the disclosure can be cured by subjecting the composition to a thermal treatment with a process temperature between about 50° C. and 100° C. Herein, the article obtained by subjecting the above curable resin composition to a thermal treatment can have a higher thermal decomposition temperature than about 300° C. Furthermore, the article exhibits high mechanical strength, high tenacity, and high thermal stability.

The following examples are intended to illustrate the disclosure more fully without limiting the scope, since numerous modifications and variations will be apparent to those skilled in the art.

Example 1

20 parts by weight of pyromellitic dianhydride (available from Alfa Aesar), 1 part by weight of Tin (II) 2-ethylhexanoate (available from Alfa Aesar), and 0.1 parts by weight of 2-ethyl-4-methylimidazole (available from T.C.I. with a trade No. of EMI-24) were added into a reaction bottle and dissolved in tetrahydrofuran (THF). Next, after stirring, 100 parts by weight of epoxy resin (diglycidyl ether of bisphenol A, available from Dow Chemical Company with a trade No. DER 383) was added into the reaction bottle. After stirring, the resin composition (I) was obtained. A coating of the resin composition (I) was formed and then was subjected to a thermal treatment with a process temperature of 100° C. The coating of the resin composition (I) was completely cured within 40 min and a cured product was obtained. Next, the thermal decomposition temperature (Td) of the cured product was measured, and the result is shown in Table 1.

Example 2

20 parts by weight of pyromellitic dianhydride (available from Alfa Aesar), 1 part by weight of Tin (11) 2-ethylhexanoate (available from Alfa Aesar), and 0.1 parts by weight of 2-ethyl-4-methylimidazole (available from T.C.I. with a trade No. of EMI-24) were added into a reaction bottle and dissolved in tetrahydrofuran (THF). Next, after stirring, 100 parts by weight of epoxy resin (diglycidyl ether of bisphenol A, available from Dow Chemical Company with a trade No. DER. 383) was added into the reaction bottle. After stirring, the resin composition (II) was obtained. A coating of the resin composition (Ti) was formed and then was subjected to a thermal treatment with a process temperature of 50° C. The coating of the resin composition (II) was completely cured for 24 hr and a cured product was obtained. Next, the thermal decomposition temperature (Td) of the cured product was measured, and the result is shown in Table 1.

Example 3

20 parts by weight of pyromellitic dianhydride (available from Alfa Aesar), 0.5 parts by weight of Tin (II) 2-ethylhexanoate (available from Alfa Aesar), and 0.3 parts by weight of 2-ethyl-4-methylimidazole (available from T.C.I. with a trade No. of EMI-24) were added into a reaction bottle and dissolved in tetrahydrofuran (THF). Next, after stirring, 100 parts by weight of epoxy resin (diglycidyl ether of bisphenol A, available from Dow Chemical Company with a trade No. DER 383) was added into the reaction bottle. After stirring, the resin composition (III) was obtained. A coating of the resin composition (III) was formed and then was subjected to a thermal treatment with a process temperature of 100° C. The coating of the resin composition (III) was completely cured within 40 min and a cured product was obtained. Next, the thermal decomposition temperature (Td) of the cured product was measured, and the result is shown in Table 1.

Example 4

20 parts by weight of pyromellitic dianhydride (available from Alfa Aesar), 0.5 parts by weight of Tin (II) 2-ethylhexanoate (available from Alfa Aesar), and 0.1 parts by weight of 2-ethyl-4-methylimidazole (available from T.C.I. with a trade No. of EMI-24) were added into a reaction bottle and dissolved in tetrahydrofuran (THF). Next, after stirring, 100 parts by weight of epoxy resin (diglycidyl ether of bisphenol A, available from Dow Chemical Company with a trade No. DER 383) was added into the reaction bottle. After stirring, the resin composition (IV) was obtained. A coating of the resin composition (IV) was formed and then was subjected to a thermal treatment with a process temperature of 100° C. The coating of the resin composition (IV) was completely cured within 60 min and a cured product was obtained. Next, the thermal decomposition temperature (Td) of the cured product was measured, and the result is shown in Table 1.

Example 5

20 parts by weight of pyromellitic dianhydride (available from Alfa Aesar), 1.0 parts by weight of Tin (II) 2-ethylhexanoate (available from Alfa Aesar), and 0.3 parts by weight of 2-ethyl-4-methylimidazole (available from T.C.I. with a trade No. of EMI-24) were added into a reaction bottle and dissolved in tetrahydrofuran (THF). Next, after stirring, 100 parts by weight of epoxy resin (diglycidyl ether of bisphenol A, available from Dow Chemical Company with a trade No. DER 383) was added into the reaction bottle. After stirring, the resin composition (V) was obtained. A coating of the resin composition (V) was formed and then was subjected to a thermal treatment with a process temperature of 100° C. The coating of the resin composition (V) was completely cured within 40 min and a cured product was obtained. Next, the thermal decomposition temperature (Td) of the cured product was measured, and the result is shown in Table 1.

Comparative Example 1

100 parts by weight of epoxy resin (diglycidyl ether of bisphenol A, available from Dow Chemical Company with a trade No. DER 383) was added into a reaction bottle, and the epoxy resin was coated to form a coating. The coating was completely cured at a temperature about 200° C. for 20 min and a cured product was obtained. Next, the thermal decomposition temperature (Td) of the cured product was measured, and the result is shown in Table 1.

Comparative Example 2

20 parts by weight of pyromellitic dianhydride (available from Alfa Aesar), and 1.0 parts by weight of Tin (II) 2-ethylhexanoate (available from Alfa Aesar) were added into a reaction bottle and dissolved in tetrahydrofuran (THF). Next, after stirring, 100 parts by weight of epoxy resin (diglycidyl ether of bisphenol A, available from Dow Chemical Company with a trade No. DER 383) was added into the reaction bottle. After stirring, the resin composition (VI) was obtained. A coating of the resin composition (VI) was formed. The coating was subjected to a thermal treatment with a process temperature of 120° C. The coating of the resin composition (VI) was completely cured within 20 min and a cured product was obtained. Next, the thermal decomposition temperature (Td) of the cured product was measured, and the result is shown in Table 1.

Comparative Example 3

20 parts by weight of pyromellitic dianhydride (available from Alfa Aesar) and 0.1 parts by weight of 2-ethyl-4-methylimidazole (available from T.C.I. with a trade No. of EMI-24) were added into a reaction bottle and dissolved in tetrahydrofuran (THF). Next, after stirring, 100 parts by weight of epoxy resin (diglycidyl ether of bisphenol A, available from Dow Chemical Company with a trade No. DER 383) was added into the reaction bottle. After stirring, the resin composition (VII) was obtained. A coating of the resin composition (VII) was formed. The coating was subjected to a thermal treatment with a process temperature of 100° C. The coating of the resin composition (VII) was completely cured within 100 min and a cured product was obtained. Next, the thermal decomposition temperature (Td) of the cured product was measured, and the result is shown in Table 1.

TABLE 1

| | | Catalyst | | | | | |
|---|---|---|---|---|---|---|---|
| | Epoxy resin (parts by weight) | Tin (II) 2-ethylhexanoate (parts by weight) | 2-ethyl-4-methylimidazole (parts by weight) | PMDA (parts by weight) | Curing temp (° C.) | Curing time (min) | Td (° C.) |
| Example 1 | 100 | 1 | 0.1 | 20 | 100 | 60 | 335.82 |
| Example 2 | 100 | 1 | 0.1 | 20 | 50 | 24 hr | 280.32 |
| Example 3 | 100 | 0.5 | 0.3 | 20 | 100 | 40 | 263.17 |
| Example 4 | 100 | 0.5 | 0.1 | 20 | 100 | 60 | 342.45 |
| Example 5 | 100 | 1 | 0.3 | 20 | 100 | 40 | 289.20 |
| Comparative Example 1 | 100 | 0 | 0 | 20 | 200 | 20 | 327.6 |
| Comparative Example 2 | 100 | 1 | 0 | 20 | 120 | 20 | 342.94 |
| Comparative Example 3 | 100 | 0 | 0.1 | 20 | 100 | 100 | 239.45 |

As shown in Table 1, in the absence of the organic tin compound or ti imidazole, the epoxy resin is cured at a high temperature of 200° C. (Comparative Example 1). In comparison with Comparative Example 1, the resin composition of Comparative Example 2 is cured at a relatively low temperature of 120° C., but the curing temperature of the composition of Comparative Example 2 is still higher than 100° C. due to the absence of the imidazole. In comparison with Comparative Example 1, the resin composition of Comparative Example 3 is cured at a relatively low temperature of 100° C., but the high thermal decomposition temperature of the cured product of the composition of Comparative Example 2 is lower than 250° C. due to the absence of the organic tin compound.

Accordingly, the disclosure provides a curable resin composition, an article and a method for fabricating the same. According to embodiments of the disclosure, the curable resin composition of the disclosure can be cured by subjecting the composition to a thermal treatment with a process temperature between about 50° C. and 100° C., since the curable resin composition includes a catalyst including an imidazole and an organic metal compound in a specific weight ratio. Furthermore, the article obtained by curing the curable resin composition of the disclosure can have a high mechanical strength, high tenacity, high thermal stability, and high thermal decomposition temperature (Td).

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A curable resin composition, essentially consisting of:
   an epoxy resin;
   an anhydride;
   a catalyst, wherein the catalyst is an imidazole and an organic metal compound, and wherein the organic metal compound is an organic tin compound, organic zinc compound, organic nickel compound, organic cobalt compound, organic copper compound, organic chromium compound, or a combination thereof, wherein the weight ratio between the organic metal compound and the imidazole is in a range from 3.3:1 to 11:1; and
   an optional additive selected from the group consisting of a pigment, filler, thickener, defoaming agent, mold release agent, stabilizer, fire retardant agent, surfactant, and a combination thereof.

2. The curable resin composition as claimed in claim 1, wherein the weight ratio between the anhydride and the epoxy resin is from 0.1 to 0.8.

3. The curable resin composition as claimed in claim 1, wherein the weight ratio between the catalyst and the anhydride is from 0.02 to 0.3.

4. The curable resin composition as claimed in claim 1, wherein the weight ratio between the catalyst and the epoxy resin is from 0.005 to 0.06.

5. The curable resin composition as claimed in claim 1, wherein the epoxy resin is selected from the group consisting of a bisphenol A epoxy resin, aliphatic epoxy resin, naphthalene epoxy resin, biphenyl epoxy resin, phenolic novolac epoxy resin, cresol novolac epoxy resin, fluorine-containing epoxy resin, aralkyl epoxy resin, and a combination thereof.

6. The curable resin composition as claimed in claim 1, wherein the anhydride is selected from the group consisting of pyromellitic dianhydride (PMDA), maleic anhydride (MA), methyltetrahydrophthalic anhydride (MTHPA), methylnadic anhydride (MNA), hexanhydrophthalic anhydride (HHPA), methylhexahydrophthalic anhydride (MHHPA), and a combination thereof.

7. The curable resin composition as claimed in claim 1, wherein the imidazole is selected from the group consisting of 2-undecylimidazole, 2-heptadecylimidazole, 2-methylimidazole, 2-ethyl-4-methylimidazole, 2-phenylimidazole, 2-phenyl-4-methylimidazole, 1-benzyl-2-methylimidazole, 1-benzyl-2-phenylimidazole, 1,2-dimethylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-undecyl imidazolium trimeritate, 1-cyanoethyl-2-phenyl imidazolium trimeritate, 2-phenyl-4,5-dihydroxymethylimidazole, 2-phenyl-4-methyl-5-dihydroxymethylimidazole, and a combination thereof.

8. The curable resin composition as claimed in claim 1, wherein the organic metal compound is selected from the group consisting of tin (II) 2-ethylhexanoate, tin isopropoxide, tin oxalate, zinc 2,4-pentane dionate, zinc acetate, zinc oxalate, dibutyltin diacetate, dibutyltin dilaurate, dioctyltin diacetate, zinc naphthenate, zinc carboxylate, nickel carboxylate, and a combination thereof.

9. An article, which is a reaction product of the composition as claimed in claim 1.

10. The article as claimed in claim 9, wherein the article has a thermal decomposition temperature more than 260° C.

11. A method for fabricating an article, comprising:
    subjecting the curable resin composition as claimed in claim 1 to a thermal treatment to obtain the article.

12. The method as claimed in claim 11, before subjecting the curable resin composition to the thermal treatment, further comprising:
    forming a coating or a film of the curable resin composition.

13. The method as claimed in claim 11, before subjecting the curable resin composition to the thermal treatment, further comprising:
    delivering the curable resin composition into a mold.

14. The method as claimed in claim 11, wherein the thermal treatment has a process temperature larger than 50° C.

15. The method as claimed in claim 11, wherein the thermal treatment has a process temperature between 50° C. and 100° C.

16. The article as claimed in claim 1, wherein the weight ratio between the catalyst and the epoxy resin is in a range from 0.01 to 0.012, and the weight ratio between the organic metal compound and the imidazole is in a range from 9:1 to 11:1.

* * * * *